US012497808B2

(12) United States Patent
Basavarajappa

(10) Patent No.: US 12,497,808 B2
(45) Date of Patent: Dec. 16, 2025

(54) MOTOR VEHICLE LOCK

(71) Applicant: Kiekert AG, Heiligenhaus (DE)

(72) Inventor: Madhu Basavarajappa, Leverkusen (DE)

(73) Assignee: Kiekert AG, Heiligenhaus (DE)

( * ) Notice: Subject to any disclaimer, the term of this patent is extended or adjusted under 35 U.S.C. 154(b) by 540 days.

(21) Appl. No.: 17/777,333

(22) PCT Filed: Nov. 13, 2020

(86) PCT No.: PCT/DE2020/100968
§ 371 (c)(1),
(2) Date: May 17, 2022

(87) PCT Pub. No.: WO2021/098912
PCT Pub. Date: May 27, 2021

(65) Prior Publication Data
US 2022/0403686 A1 Dec. 22, 2022

(30) Foreign Application Priority Data
Nov. 19, 2019 (DE) ..................... 10 2019 131 179.9

(51) Int. Cl.
*E05B 79/08* (2014.01)
*E05B 85/02* (2014.01)
*E05B 85/24* (2014.01)

(52) U.S. Cl.
CPC ............ *E05B 85/243* (2013.01); *E05B 79/08* (2013.01); *E05B 85/02* (2013.01)

(58) Field of Classification Search
CPC .......... E05B 79/02; E05B 79/08; E05B 85/02; E05B 2015/041; E05B 2015/0437; E05B 2015/0441
See application file for complete search history.

(56) References Cited

U.S. PATENT DOCUMENTS 5,494,321 A * 2/1996 Ishihara .................. E05B 83/36 292/216
6,336,668 B1 * 1/2002 Bendel .................... E05B 79/08 292/214

(Continued)

FOREIGN PATENT DOCUMENTS

DE 29716023 U1 * 11/1997 ............. E05B 79/08
DE 10232184 A1 2/2004

(Continued)

OTHER PUBLICATIONS

International Search Report mailed Feb. 18, 2021, for priority International Patent Application No. PCT/DE2020/100968.

*Primary Examiner* — Alyson M Merlino
(74) *Attorney, Agent, or Firm* — Renner, Otto, Boisselle & Sklar, LLP

(57) ABSTRACT

A motor vehicle lock, in particular a motor vehicle door lock, which has a lever arrangement consisting of at least two levers. The two levers are supported coaxially with respect to each other on a common bearing pin. The bearing pin is anchored in a lock housing. According to the invention, the bearing pin consists of at least two parts, namely a plug-in pin and a plug-in pin receptacle. Each bearing pin part is provided with one stop which together form a spacer between the two levers.

13 Claims, 5 Drawing Sheets

(56) References Cited

U.S. PATENT DOCUMENTS

| | | | | |
|---|---|---|---|---|
| 7,380,845 | B2 * | 6/2008 | Suzumura | E05B 81/16 292/216 |
| 7,559,586 | B2 * | 7/2009 | Fukunaga | E05B 83/36 292/201 |
| 7,874,599 | B2 * | 1/2011 | Suzumura | E05B 85/02 292/201 |
| 9,151,087 | B2 * | 10/2015 | Akizuki | E05B 85/02 |
| 10,641,016 | B2 * | 5/2020 | Damboiu | E05B 79/08 |
| 11,352,819 | B2 * | 6/2022 | Yokota | E05B 79/08 |
| 11,371,268 | B2 * | 6/2022 | Graute | E05B 79/08 |
| 2008/0121062 | A1 | 5/2008 | Yoda | |
| 2014/0053618 | A1 | 2/2014 | Yamaguchi et al. | |
| 2019/0211588 | A1 * | 7/2019 | Graute | E05B 79/08 |

FOREIGN PATENT DOCUMENTS

| | | | | |
|---|---|---|---|---|
| DE | 602006000788 | T2 | 4/2009 | |
| DE | 102014114580 | A1 * | 4/2016 | E05B 79/08 |
| DE | 102016110201 | A1 | 12/2017 | |
| DE | 102017104152 | A1 * | 8/2018 | E05B 77/10 |
| EP | 1726754 | A1 | 11/2006 | |
| EP | 1323883 | B1 | 8/2008 | |
| FR | 2768168 | A1 * | 3/1999 | E05B 79/08 |
| FR | 3026424 | A1 * | 4/2016 | E05B 79/08 |
| GB | 2527648 | A * | 12/2015 | E05B 77/28 |
| WO | 2016055052 | A1 | 4/2016 | |

* cited by examiner

MOTOR VEHICLE LOCK

This application is a national phase of International Application No. PCT/DE2020/100968 filed Nov. 13, 2020, which claims priority to German Application No. 10 2019 131 179.9 filed Nov. 19, 2019, each of which is hereby incorporated herein by reference in its entirety.

FIELD OF DISCLOSURE

The invention relates to a motor vehicle lock, in particular a motor vehicle door lock, comprising a lever arrangement consisting of at least two levers, the two levers being supported coaxially with respect to each other on a common bearing pin, and the bearing pin being anchored in a lock housing.

The term motor vehicle lock is to be interpreted broadly within the scope of the invention. This includes not only the preferred motor vehicle door locks, but also, for example, locks on motor vehicle seats, motor vehicle flaps, etc. In addition to the two aforementioned obligatory levers, a locking mechanism consisting of a catch and a pawl is usually implemented. The levers are usually components of an actuating lever chain and/or a locking lever chain or both. In the case of two levers of an actuating lever chain, these ensure, for example, that the locking mechanism can be opened, for example, when said levers are acted upon and assuming a continuous mechanical connection. For this purpose, the mentioned actuating lever chain with the two levers functions at the end via, for example, a release lever on the pawl that is in engagement with the catch in the closed state of the locking mechanism. As a result, the pawl is lifted and the locking mechanism and thus the motor vehicle lock in question can be opened.

BACKGROUND OF DISCLOSURE

If the two levers are part of a locking lever chain, a coupling element present in the actuating lever chain, for example, can be transferred into its engaged or disengaged position by means of this locking lever chain. In the engaged position, the coupling element ensures a mechanically continuous actuating lever chain, such that the previously mentioned opening of the locking mechanism can be completed when said lever chain is acted upon. If, however, the coupling element is disengaged, the actuating lever chain is mechanically interrupted, for example during an opening process, such that the opening process is ineffective and the locking mechanism cannot be opened. This usually corresponds to the “locked” functional position, whereas the continuous actuating lever chain is associated with the “unlocked” functional position.

In principle, the two levers can also be part of both the actuating lever chain and the locking lever chain. For example, an internal locking lever and an internal actuating lever can be supported coaxially with respect to each other on the common bearing pin. In this case, a coupling element may also be interposed. In this case, the motor vehicle lock is designed as a motor vehicle side door lock on a rear motor vehicle side door having a child safety device. The coupling element can then be transferred into the engaged and disengaged position thereof relative to the actuating lever chain and consequently the internal actuating lever via the internal locking lever. Of course, this is only exemplary and not limiting.

The generic prior art according to EP 1 323 883 B1 relates to a motor vehicle lock which is provided with two actuating levers and additionally a safety device, e.g. a child safety device. The safety device ensures that the actuating lever is separated from the locking mechanism in the “on” position thereof. By means of a coupling lever as part of the safety device, the actuating levers can be connected and disconnected from one another.

The two actuating levers are in this case supported coaxially and in a coplanar manner with respect to each other. In addition, a slotted lever is also supported on the corresponding axis as a further component of the safety device. This has proven itself in principle.

However, in practice there is often the additional problem that the two levers, which are supported coaxially with respect to each other on the common bearing pin, are additionally to be provided with a spring or another further component between them. If, for example, a spring is interposed, in the example described above it may be an internal actuating lever spring, i.e. a spring by means of which the internal actuating lever is pivoted back, for example, into its starting position after it has been acted upon.

In the example, the attachment of the spring between the levers, which are supported coaxially with respect to each other, generally requires that the two levers be at a defined distance from one another. In practice, this distance is typically achieved using an interposed spacer and is adjusted during assembly. This leads to an arrangement and assembly which are overall relatively complex. This is because, not only do the two levers have to be placed on the common bearing pin, but it is additionally necessary to attach the spacer in connection with the spring in question before the second lever is mounted. Only then can the second lever be placed on the bearing pin.

Apart from the fact that such an approach requires a large number of components to be combined with one another, there is also the danger that the spacer in question will simply be “forgotten.” In certain circumstances, this does not have direct effects on the functionality of the motor vehicle lock, but often only becomes noticeable in further and repeated operation. The invention as a whole seeks to remedy this.

SUMMARY OF DISCLOSURE

The invention is based on the technical problem of further developing such a motor vehicle lock and in particular such a motor vehicle door lock in such a way that the number of components required is reduced and assembly is simplified while at the same time maintaining functionality.

In order to solve this technical problem, in the case of a generic motor vehicle lock in the context of the invention, the invention proposes that the bearing pin is formed in two parts with a plug-in pin and plug-in pin receptacle, the two bearing pin parts each being provided with a stop to together define a spacer between the two levers.

In the context of the invention, a two-part bearing pin is therefore used first. One bearing pin part is designed as a plug-in pin and the other bearing pin part is designed as a plug-in pin receptacle. In the course of the assembly, the two bearing pin parts are then coupled to one another by means of a plug-in connection. Since the relevant bearing pin part is provided with a stop in each case, when the plug-in pin and plug-in pin receptacle are combined, the stops provided on both sides result in the spacer, which was previously produced as a separate component and had to be installed, being automatically implemented between the two levers.

As a result, a considerable simplification is already achieved in terms of the number of components required and the necessary assembly.

According to a further advantageous embodiment, the lock housing is formed in two parts with a housing shell and a housing cover. According to a further advantageous embodiment, the housing shell generally has the plug-in pin, while the housing cover is provided with the plug-in pin receptacle. This achieves a further reduction in components. This is because the two-part bearing pin is practically formed as part of the housing shell and as part of the housing cover, which together define the lock housing for the motor vehicle lock, which is mandatory in any case.

In this case, the relevant bearing pin part is usually formed on the housing shell or the housing cover. It has proven to be particularly favorable in this case for the housing shell and the housing cover to each be designed as plastics injection-molded parts. As a result, the production of the bearing pin can be practically integrated into the production of the housing shell and the housing cover. This is because, in the course of the plastics injection molding process for producing the two components of the lock housing, the plug-in pin is automatically implemented on the housing shell and the plug-in pin receptacle is automatically implemented on the housing cover. Of course, this can also be reversed. In this case, the plug-in pin receptacle is provided on the housing shell, while the housing cover is provided with the plug-in pin.

It has also proven to be advantageous for the stop to be formed eccentrically on the relevant bearing pin part. This is because, as a result of this eccentric design, the lever placed on and associated with the relevant bearing pin part can easily be placed on the bearing pin part, specifically on the plug-in pin and on the plug-in pin receptacle. In this case, it is only necessary to slightly radially move the relevant lever with an obligatory through-opening for the bearing pin part after passing the eccentric stop during the plug-in connection. This will be explained in more detail with reference to the description of the drawings.

The stop is usually designed as a circular arc segment. In this case, it has also proven useful for the circular arc segment to be adapted to the through-opening in question in the relevant lever. As a result, the lever can easily be placed on the relevant bearing pin part, in which case the lever, with through-opening thereof, has to be slightly moved radially over a certain region during the axial placement movement. In any case, this ensures additional securing of the lever on the bearing pin part. At the same time, this simplifies assembly because the lever cannot unintentionally fall or slide down after it has been mounted on the plug-in pin or the plug-in pin receptacle.

Finally, both the plug-in pin and the plug-in pin receptacle are generally provided with stepped diameters in the axial direction. These stepped diameters function cooperatively as an axial stop, such that after the plug-in pin has been inserted into the plug-in pin receptacle, the correct distance of the two associated stops from one another is provided with the definition of the spacer. In addition, in this context, the design can be such that the plug-in pin receptacle is provided with a lateral opening, so that the plug-in pin can be mounted in the plug-in pin receptacle not only in the sense of a purely axial plug-in connection, but the plug-in pin can also, to a small extent, be radially inserted through the lateral opening into the plug-in pin receptacle.

Finally, a spiral spring surrounding the bearing pin is typically additionally mounted and implemented. The spiral spring in question is automatically positioned on the spacer and axially secured relative thereto by the two respective stops on the two bearing pin parts that define the spacer in the assembled state. In addition, by together defining the spacer, the two stops ensure that the levers mounted on the assembled bearing pin maintain their predetermined distance.

As a result, a motor vehicle lock and in particular a motor vehicle door lock is provided that offers clear advantages over the prior art with regard to the reduction in components and simplification of assembly achieved. In fact, the common bearing pin for the two levers is formed in two parts and is advantageously defined on the housing shell and on the housing cover of the obligatory lock housing. The combination of the housing shell and the housing cover consequently automatically and simultaneously results in the two bearing pin parts being combined with one another at the same time.

In this way, not only the separate bearing pin but also the additionally provided spacer are omitted. This significantly reduces the manufacturing costs and also the storage costs. At the same time, this simplifies assembly because significantly fewer components have to be coupled together than before. Finally, this has the consequence that functional reliability is also increased, because there is no risk of one of the many components simply being forgotten during assembly, as is the case with the prior art. The substantial advantages can be seen here.

BRIEF DESCRIPTION OF DRAWINGS

The invention is explained in greater detail below with reference to drawings, which show only one exemplary embodiment. In the drawings.

DETAILED DESCRIPTION

Figure 1:
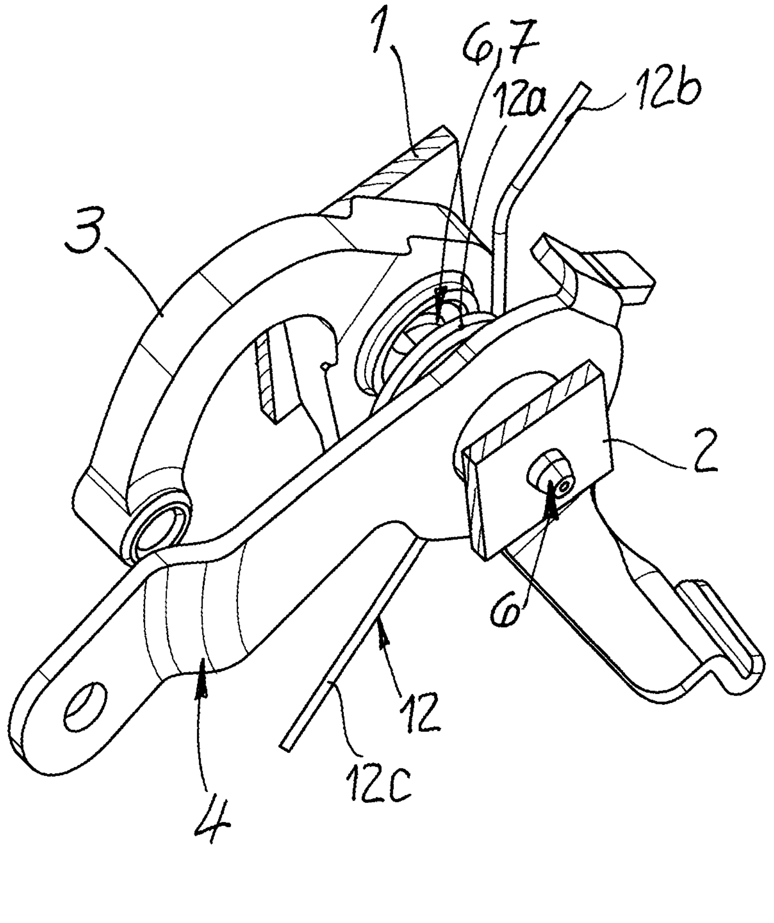
FIG. 1 shows the motor vehicle lock according to the invention in the form of a motor vehicle door lock in perspective in a first embodiment variant.

The drawings show a motor vehicle lock which, in the exemplary embodiment, is a motor vehicle door lock. This has a locking mechanism (not shown in greater detail) consisting of a catch and pawl that functions in a conventional manner. In addition, a lock housing 1, 2 is provided, which houses the entire arrangement. According to the exemplary embodiment, the lock housing 1, 2 provided is in two parts with a housing shell 1 and a housing cover 2, which are only partially shown in the exemplary embodiment.

In addition, a lever arrangement 3, 4, 5 consisting of at least two levers 3, 4 is provided and implemented. The two levers 3, 4 are, according to the exemplary embodiment and not by way of limitation, an internal locking lever 3 and an internal actuating lever 4. In the context of the variant according to FIG. 2, a further third lever 5 is added to the two levers 3, 4, which third lever is a coupling lever 5 in the example. In addition, in this variant according to FIG. 2, the internal actuating lever 4 is formed in two parts with a first internal actuating lever 4a and a second internal actuating lever 4b.

Figure 2:
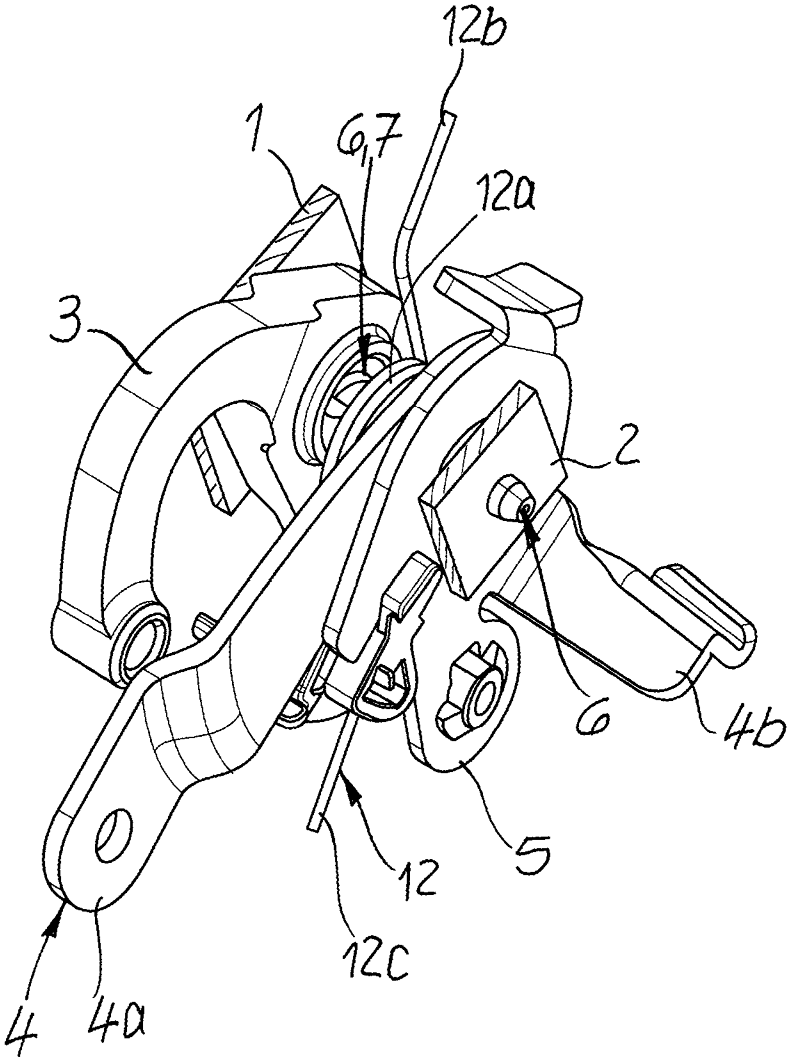
FIG. 2 shows the subject matter according to FIG. 1 in a modified second embodiment variant.

In the "engaged" state shown in FIG. 2, the coupling lever 5 which can be actuated by means of the internal locking lever 3 ensures that the two internal actuating levers 4a, 4b are mechanically connected to one another in the variant according to FIG. 2, such that in this case the locking mechanism can optionally be opened via a release lever (not shown) via an internal handle and the assembled internal actuating lever 4a, 4b. The "child safety device off" state corresponds to this in the example.

In the "child safety device on" position, however, the coupling lever 5 ensures that the two internal actuating levers 4a, 4b are mechanically separated from one another in the example, such that a mechanical connection is interrupted up to the locking mechanism and any actuations of the assembled internal actuating lever 4a, 4b are ineffective. As already explained, the coupling lever 5 is actuated by means of the internal locking lever 3 in the example. In the following, however, the version corresponding to the illustration in FIG. 2 and the coupling lever 5 provided there is of secondary interest, and this will therefore not be discussed in more detail below.

Figure 3:
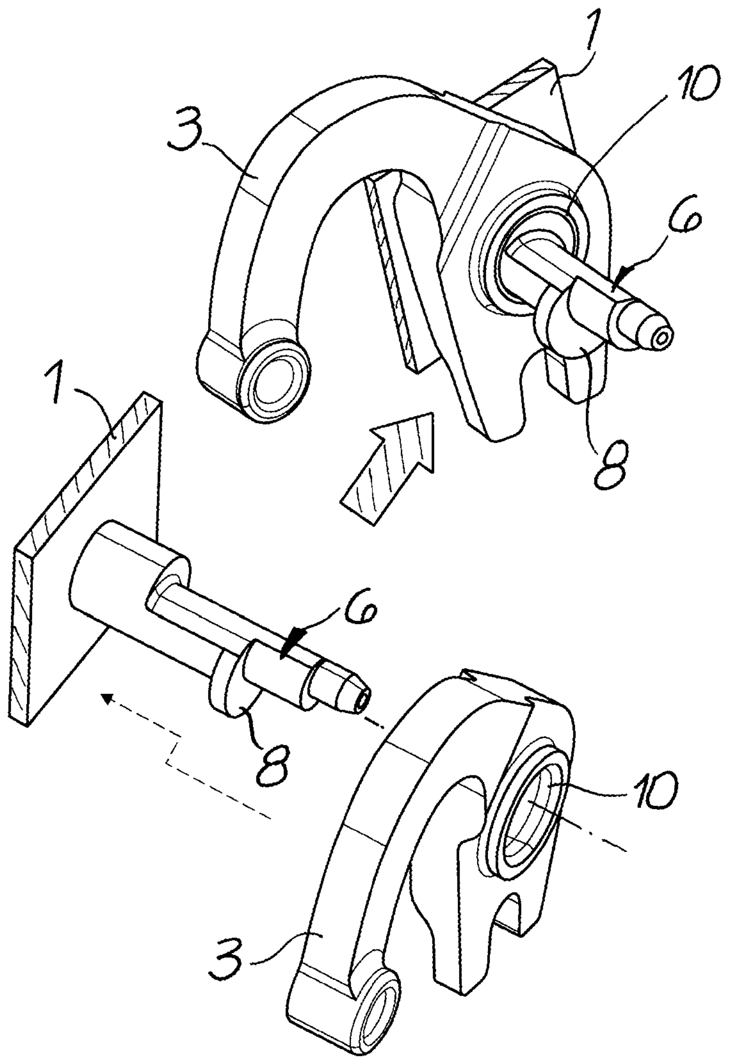
FIG. 3 shows the subject matter according to FIG. 1 in the course of the mounting of the one first lever.
Figure 4:
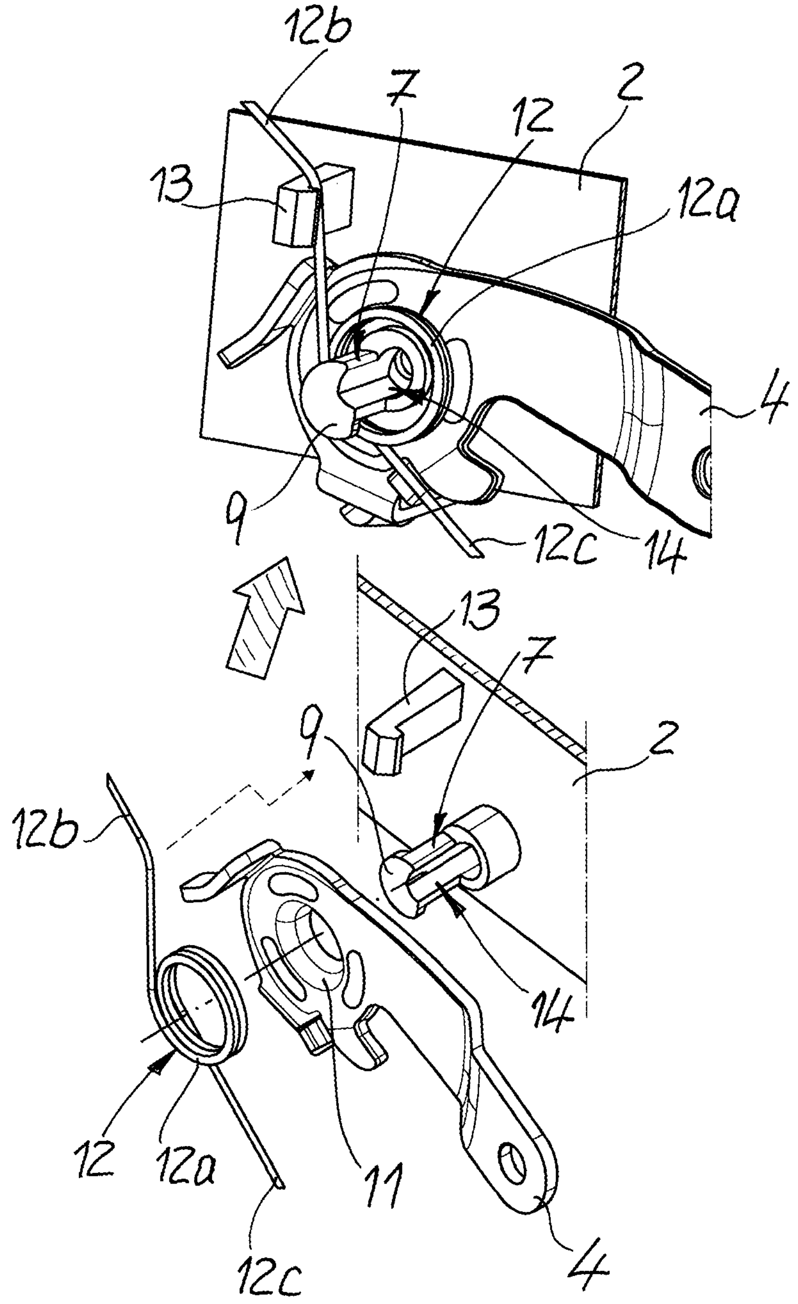
FIG. 4 shows the subject matter according to FIG. 1 during the mounting of the other, second lever and the optional spiral spring.
Figure 5:
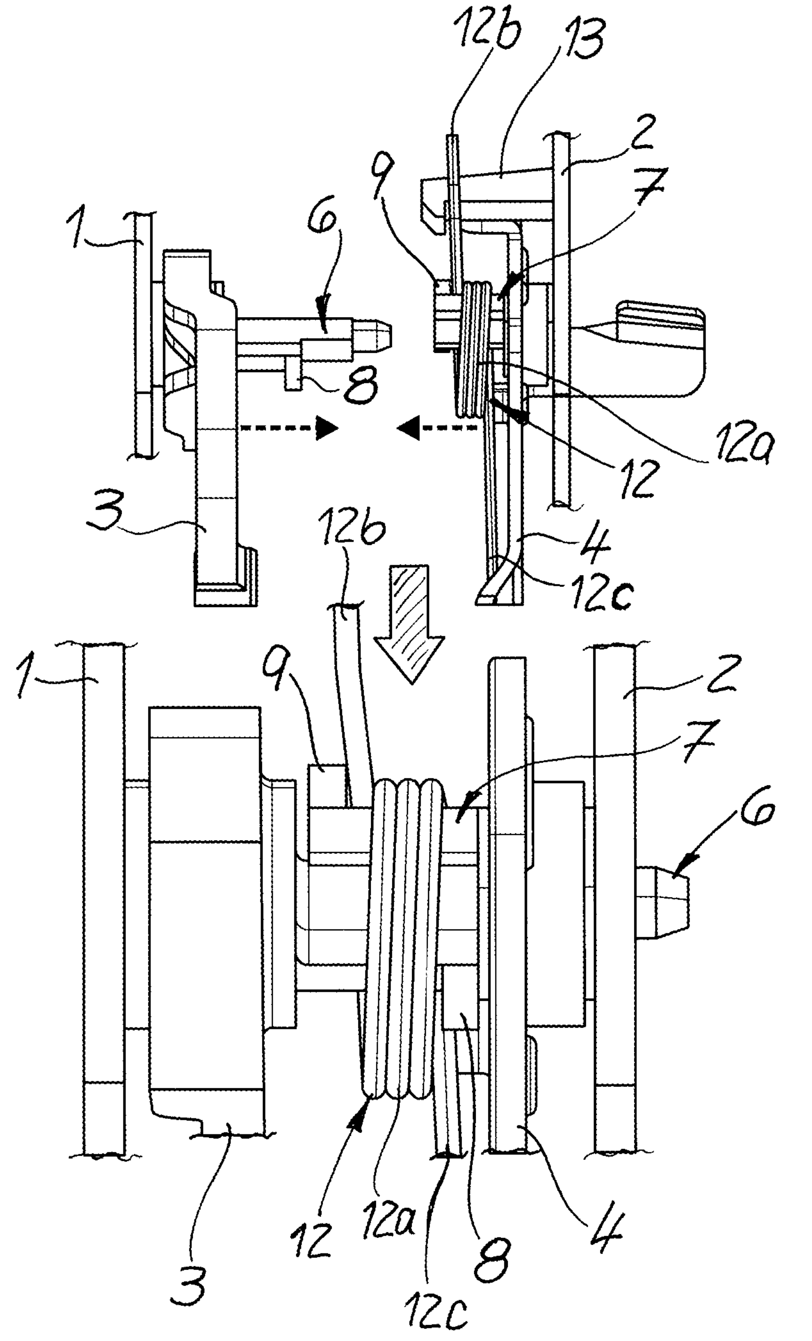
FIG. 5 shows the complete assembly process in an exploded view and in the assembled state.

In particular, a comparison of FIG. 1 in conjunction with the assembly sequence according to FIGS. 3 to 5 makes it clear that the two levers 3, 4 are supported coaxially with respect to each other on a common bearing pin 6, 7. For this purpose, the bearing pin 6, 7 is anchored in the lock housing 1, 2.

According to the invention, the bearing pin 6, 7 is formed in two parts with a plug-in pin 6 and a plug-in pin receptacle 7. In this case, the plug-in pin 6 and the plug-in pin receptacle 7 each define a bearing pin part 6, 7 and together define the bearing pin 6, 7.

In addition, it can be seen that the two aforementioned bearing pin parts 6, 7 are each provided with a stop 8, 9. The stop 8 is located on the plug-in pin 6, whereas the other stop 9 is formed on the plug-in pin receptacle 7. In addition, according to the invention, the design is such that the two bearing pin parts 6, 7, with their relevant stop 8, 9, together define a spacer 8, 9 between the two levers 3, 4 in the assembled state according to the illustration in FIG. 5. This means that the spacer 8, 9 is composed of the two stops 8, 9 which are each formed separately.

In addition, the design is such that the housing shell 1 is provided with the plug-in pin 6. This can be seen in FIG. 3. In contrast, the housing cover 2 is provided with the plug-in pin receptacle 7, as clearly shown in FIG. 4. In principle, this can also be reversed. In this case, the plug-in pin receptacle 7 is located on the housing shell 1, whereas the housing cover 2 is provided with the plug-in pin 6. However, this is not shown.

FIGS. 3 and 4 also make it clear that the relevant bearing pin part 6, 7 is formed on the housing shell 1 or the housing cover 2, respectively. In fact, the design is such that the housing shell 1 and the housing cover 2 are each designed as a plastics injection-molded part. As a result, the plug-in pin 6 on the housing shell 1 can be formed on the housing shell 1 in the course of a common plastics injection molding process. In the same way, the plug-in pin receptacle 7 can also be formed on the housing cover 2, which is also produced in the course of a plastics injection molding process.

FIGS. 3 and 4 also make it clear that the relevant stop 8, 9 is formed eccentrically on the associated bearing pin part 3, 4. In fact, according to the exemplary embodiment, the relevant stop 8, 9 is a circular arc segment. In addition, the design is such that the circular arc segment in question or the associated stop 8, 9 as a whole is adapted to a corresponding through-opening 10, 11 in the relevant lever 3, 4.

It can be seen that the internal locking lever 3 is provided with the through-opening 10 for the plug-in pin 6, as the assembly process in FIG. 3 shows. By contrast, the internal actuating lever 4 has the through-opening 11, by means of which the internal actuating lever 4 is placed on the plug-in pin receptacle 7, as the assembly process according to FIG. 4 makes clear. After the internal actuating lever 4 has been placed on the plug-in pin receptacle 7, a spiral spring 12 is then additionally placed on the plug-in pin receptacle 7 with the coiled portion 12a thereof. When the spiral spring 12 is mounted on the plug-in pin receptacle 7 according to the exemplary embodiment, one leg 12b of the spiral spring 12 that extends from the coiled portion 12a then additionally engages behind a stop 13 which is also formed on the housing cover 2. The other second, free leg 12c acts on the internal actuating lever 4 in the mounted state according to FIG. 5, and ensures, for example, that the internal actuating lever 4 is pivoted back into the basic position thereof after it has been deflected, for example in order to open the locking mechanism.

Since, according to the exemplary embodiment, the relevant stop 8, 9 is designed as a circular arc segment and is also adapted to the associated through-opening 10 in the internal locking lever 3 and to the through-opening 11 in the internal actuating lever 4, which otherwise largely correspond in terms of size, the process of placing the relevant lever 3, 4 on the bearing pin part 6, 7 takes place in such a way that a mounting direction shown in dashed lines in each of FIGS. 3 and 4 is not only in the axial direction in this case, but a radial movement is additionally required in the region of the relevant stop 8, 9. As a result, the relevant lever 3, 4 is simultaneously captively held on the plug-in pin 6 or on the plug-in pin receptacle 7, respectively, in the pre-mounted state shown in FIGS. 3 and 4.

Finally, it can be seen in particular in FIG. 4 that the plug-in pin receptacle 7 is provided with a lateral opening 14. As a result, the plug-in pin receptacle 7 has a cylinder-segment-like character. In fact, the lateral opening 14 in the plug-in pin receptacle 7 facilitates the combination of the preassembled structural units according to FIGS. 3 and 4, which combination is then shown in FIG. 5. In addition, FIGS. 3 and 4 make it clear that both the plug-in pin 6 and the plug-in pin receptacle 7 are provided with stepped diameters in the axial direction. These stepped diameters ensure that when the two bearing pin parts 6, 7 are in the assembled state in accordance with the lower illustration in FIG. 5, the two stops 8, 9 defining the spacer 8, 9 are at a predetermined distance. As a result, the spiral spring 12 previously placed on the plug-in pin receptacle 7 in the context of the illustration according to FIG. 4 is also correctly positioned with the coiled portion 12a thereof on the assembled bearing pin 6, 7, as can be seen in FIG. 5.

REFERENCE SIGNS

1 housing shell
2 housing cover
3 internal locking lever
4 internal actuating lever
4a internal actuating lever
4b internal actuating lever
5 coupling lever
6 plug-in pin

7 plug-in pin receptacle
8 stop
9 stop
10, 11 through-opening
12 spiral spring
12*a* coiled portion
12*b* leg
12*c* leg
13 stop
14 lateral opening

The invention claimed is:

1. A motor vehicle door lock comprising:

a lever arrangement including at least two levers, the at least two levers being supported coaxially with respect to each other on a common bearing pin, the common bearing pin being anchored in a lock housing, wherein the common bearing pin is formed in two bearing pin parts including a plug-in pin and a plug-in pin receptacle, the two bearing pin parts each being provided with a stop that together define a spacer between the at least two levers, wherein the stops and the spacer are arranged between the at least two levers when the at least two levers are assembled onto a respective one of the two bearing pin parts and the plug-in pin is received in the plug-in pin receptacle, so as to form the common bearing pin on which the at least two levers are coaxially supported, wherein each of the stops of the bearing pin parts is designed as a circular arc segment that extends eccentrically from a respective one of the two bearing pin parts to extend partially along the respective one of the two bearing pin parts.

2. The motor vehicle lock according to claim 1, wherein the lock housing is formed in two parts including a housing shell and a housing cover.

3. The motor vehicle lock according to claim 2, wherein the housing shell includes the plug-in pin and the housing cover includes the plug-in pin receptacle.

4. The motor vehicle lock according to claim 3, wherein either of the two bearing pin parts is formed on the housing shell or the housing cover.

5. The motor vehicle lock according to claim 4, wherein the housing shell and the housing cover are each designed as a plastics injection-molded part.

6. The motor vehicle lock according to claim 2, wherein the housing shell includes the plug-in pin receptable and the housing cover includes the plug-in pin.

7. The motor vehicle lock according to claim 1, wherein each stop passes through a through-opening in a respective one of the at least two levers during assembly of the at least two levers onto the respective one of the two bearing parts.

8. The motor vehicle lock according to claim 1, wherein both the plug-in pin and the plug-in pin receptacle are provided with stepped diameters in an axial direction.

9. The motor vehicle lock according to claim 1, further comprising a spiral spring that surrounds the common bearing pin when the plug-in pin is received in the plug-in pin receptacle, so as to form the common bearing pin.

10. The motor vehicle lock according to claim 9, wherein the lock housing is formed in two parts including a housing shell and a housing cover; and wherein the spiral spring includes a first leg that engages another stop formed on the housing cover and a second leg that acts on an internal actuating lever, one of the at least two levers.

11. The motor vehicle lock according to claim 1, wherein the at least two levers include an internal locking lever and an internal actuating lever, and the internal actuating lever is formed in two parts.

12. The motor vehicle lock according to claim 11, further comprising a coupling lever that couples the two parts of the internal actuating lever together during a first operation, and mechanically separates the two parts of the internal actuating lever from each other during a second operation.

13. The motor vehicle lock according to claim 12, wherein the coupling lever is actuated by the internal locking lever.

* * * * *